United States Patent Office 3,133,810
Patented May 19, 1964

3,133,810
HERBICIDAL COMPOSITIONS
Philip C. Hamm, Webster Groves, Mo., assignor to Monsanto Chemical Company, St. Louis, Mo., a corporation of Delaware
No Drawing. Filed Apr. 19, 1961, Ser. No. 104,013
12 Claims. (Cl. 71—2.7)

This invention relates to herbicidal compositions and specifically to compositions which are useful in removing objectionable plants from areas in which crop plants are growing. The invention consists in providing mixtures of herbicidal compounds which are more effective than the individual components.

Generally, the different plant genera have distinct susceptibilities to chemical toxicants. The plant enzymes which are affected by certain herbicides are frequently found in a broad class of similar plants. Thus, some herbicides are effective in removing a specific genus or a limited number of genera whereas others are effective in removing different genera of plants. The herbicidal composition is chosen with view of the crop plant and the problem weed in that area. Frequently, the mixing of herbicides required to control certain combinations of weeds present produces a composition not only toxic to the objectionable weeds but also to the crop plants.

The purpose of the present invention is to provide mixtures of herbicides which have complementary effects and will therefore control a broader number of plant genera but do so at lower levels of application. A further purpose of the invention is to provide herbicidal mixtures which have plant toxicities such that there is a wider range of tolerance to crop plants. These and other purposes set forth hereinafter have been accomplished.

In accordance with this invention it has been found that a mixture of 10 to 90 parts by weight of an alpha-chloroacetamide having two adiphatic substituents of two to three carbon atoms on the amide nitrogen atom, and 90 to 10 parts of a chloro substituted allyl ester of a dithiocarbamic acid having nitrogen substituents of two to three carbon atoms, has greater herbicidal activity, at lower levels of application, and better vegetable crop tolerance than do the individual components.

The alpha-chloro N,N-dialiphatic hydrocarbon substituted acetamides are those wherein the aliphatic substituents have two to three carbon atoms and may be either saturated or unsaturated. Suitable acetamides for the practice of this invention are:

Alpha-chloro N,N-diallyl acetamide
Alpha-chloro N,N-diethyl acetamide
Alpha-chloro N,N-dipropargyl acetamide
Alpha-chloro N,N-di(n-propyl) acetamide The dithiocarbamates which are admixed with the alpha-chloroacetamides to prepare the novel compositions are the N,N-dialiphatic substituted chloroallyl esters of dithiocarbamic acid, for example, those of the structure

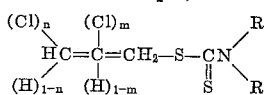

wherein *n* and *m* are each integers from zero (0) to one (1) provided that at least one of *m* and *n* is one (1); wherein R is an aliphatic hydrocarbon radical of up to three carbon atoms which includes:

2-chloroallyl N,N-diethyl dithiocarbamate
2-chloroallyl N,N-diallyl dithiocarbamate
2-chloroallyl N,N-di(n-propyl) dithiocarbamate
2-chloroallyl N,N-di(n-propargyl) dithiocarbamate
2,3-dichloroallyl N,N-diethyl dithiocarbamate
2,3-dichloroallyl N,N-diallyl dithiocarbamate
2,3-dichloroallyl N,N-di(n-propyl) dithiocarbamate
2,3-dichloroallyl N,N-di(n-propargyl) dithiocarbamate
3-chloroallyl N,N-diethyl dithiocarbamate
3-chloroallyl N,N-diallyl dithiocarbamate
3-chloroallyl N,N-di(n-propyl) dithiocarbamate
3-chloroallyl N,N-di(n-propargyl) dithiocarbamate To demonstrate the synergistic activity of the mixtures of the two types of compounds, greenhouse experiments were conducted with a variety of weed species and cultivated plants as follows:

Rye grass _____ A
Foxtail _____ B
Barnyard grass _____ C
Crab grass _____ D
Chickweed _____ E
Moss rose _____ F
Spinach _____ G
Lettuce _____ H Aluminum pans with perforated bottoms were filled with topsoil to the depth of 2⅜ inches. Seeds of each type were laid on the surface and covered with ⅜ inch of additional soil. Seeded pans were sprayed with acetone solutions of N,N-diallyl alpha-chloroacetamide (compound No. 1) in an amount equivalent to 0.1 pound per acre. Other pans with solutions of 2-chloroallyl N,N-diethyldithiocarbamate (compound No. 2), and other pans with a solution equivalent to 0.05 pound of each. Untreated pans were used as a control to ascertain the germination rate of each seed.

The pans were placed on a greenhouse bench flooded with ½ inch of water. After 14 days the pans were examined and the percentage of each plant destroyed was observed. This figure, which was adjusted by the plant germination rates, was the percentage of control. The following data was observed:

| Seed | A | B | C | D | E | F | G | H |
|---|---|---|---|---|---|---|---|---|
| 0.1 pound per acre of N,N-diallyl-alpha-chloro acetamide (1) | 88 | 7 | 70 | 61 | 51 | 71 | 0 | 27 |
| 0.1 pound per acre of 2-chloroallyl-N,N-diethyl dithiocarbamate (2) | 91 | 0 | 59 | 44 | 66 | 50 | 0 | 0 |
| Mixture of Compound No. 1 and 2 at 0.05 pounds of each | 96 | 59 | 89 | 86 | 95 | 100 | 0 | 0 |

It will be noticed that in all cases the mixture of half proportions of each gives a control superior to that of the full proportion of either. It will also be noticed that the vegetable crop plants are not affected by the mixture, whereas with the full proportion of one of the components, serious inhibition is observed.

In the practice of this invention mixtures of from 10 to 90% by weight of each component may be used, but with 40 to 60% of each optimum results are obtained. The compounds have little or no solubility in water but they can penetrate plant seedlings and destroy vital enzymes essential to the normal growth or life of the plane. Why the two types of compounds produce results superior to the effect of either is not known, but it appears to be due to the joint activities of the components on the enzymes.

The new herbicidal compounds may be formulated in a variety of ways for example solids, liquids, emulsions and other dispersions.

The solid formulations, frequently referred to as "dusts," may contain in addition to the active ingredients, diluents or extenders, dispersing agents to prevent local high concentrations, and agents to facilitate distribution in soil or soil waters. Suitable solid diluents are those which render the compositions permanently dry and free flowing. Thus, hydroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight, of the entire formulation as applied to plant or soil. The more concentrated herbicides will require dilution by the user in order to properly condition the soil for the most effective usage. The concentrated solid herbicidal formulation can be used with less danger if it is mixed with the surface soil by means of a disk-plow or harrow at the time of application.

Of particular importance are the granular formulations, which permit the uniform application of effective concentrations. Since larger granules will often induce excessive concentration locally and leave some interstitial areas untreated, mesh size smaller than 10 is preferred. Since some of the active components may be irritants to skin tissue, excessive fines should be avoided. Thus, it is undesirable to use compositions with particles smaller than 100 mesh (100 apertures per inch). Optimum particles sizes are 20 to 60 mesh. The narrow range of particles sizes also favors the uniform distribution by means of mechanical spreading equipment, large particles and excessive fines interfere with the proper operation of the nozzles on the applicators.

The liquid compositions for herbicidal use may be suspensions or other liquid dispersions. The choice of a liquid medium will depend to some extent upon the physical properties of the active ingredient. The components are not water-soluble, and, therefore, aqueous formulations will necessarily be dispersions of minute particles of the water-insoluble substances in suspension in an aqueous medium. The water-insoluble herbicidal compositions may first be dissolved in a suitable organic solvent and the organic solution of the active ingredient then incorporated in water or in any aqueous medium to produce a heterogeneous dispersion of the active ingredients in water.

One composition which aids in the effectivity of the herbicidal component is a surface active agent, which serves in providing uniform dispersions of all formulation components of both solid and liquid types, and may be anionic, cationic or non-ionic types, and includes conventional soaps such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight, organic compounds, algin soaps, ethylene oxide condensed with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10% and frequently as low as 0.05%. In general, concentrations of from 0.5 to 5% are found to be optimum.

Many of the formulations are benefited by the incorporation of organic solvents for the active components, such as the water-immiscible organic alcohols, ketones and hydrocarbons, for example isopropanol, benzene, acetone, methyl ethyl ketone, kerosene, and chlorinated hydrocarbons. The proportions of such organic liquid additives will depend upon the solubility properties of the active ingredient, and may require as little as 1% or as much as 20% in order to provide a uniformly dispersed formulation, which is capable of maintaining its dispersed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations, for example up to 20%, so that upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose readily flowable compositions are required, in either liquid or solid state. Thus, a critical aspect of the invention is the fluent carrier without which the optimum herbicidal effects frequently cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of the herbicide.

The embodiments of the invention in which an exclusive property or privilege is claimed are defined as follows:

1. A herbicidal composition comprising from 10 to 90 parts by weight of a compound of the structure

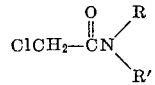

wherein R and R′ are aliphatic hydrocarbon radicals having from two (2) to three (3) carbon atoms; and from 90 to 10 parts of a compound of the structure

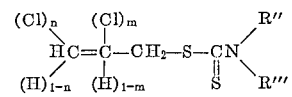

wherein $m$ and $n$ are each integers from zero (0) to one (1) provided that at least one of $m$ and $n$ is one (1); and wherein R″ and R‴ are aliphatic hydrocarbon radicals having up to three (3) carbon atoms.

2. A herbicidal composition comprising from 10 to 90 parts by weight of a compound of the structure

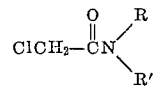

wherein R and R′ are aliphatic hydrocarbon radicals having from two (2) to three (3) carbon atoms; and from 90 to 10 parts of a compound of the structure

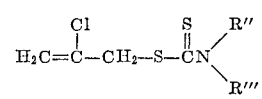

wherein R″ and R‴ are aliphatic hydrocarbon radicals having from two (2) to three (3) carbon atoms; and a herbicide adjuvant.

3. A herbicidal composition comprising from 10 to 90 parts by weight of a compound of the structure

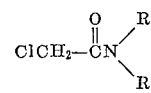

wherein R and R′ are aliphatic hydrocarbon radicals having from two (2) to three (3) carbon atoms; and from 90 to 10 parts of a compound of the structure

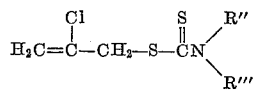

wherein R″ and R‴ are aliphatic hydrocarbon radicals having from two (2) to three (3) carbon atoms; and a granular clay.

4. A herbicidal composition comprising from 10 to 90 parts by weight of a compound of the structure

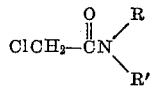

wherein R and R′ are aliphatic hydrocarbon radicals having from two (2) to three (3) carbon atoms; and from 90 to 10 parts of a compound of the structure

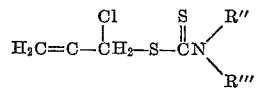

wherein R″ and R‴ are aliphatic hydrocarbon radicals having from two (2) to three (3) carbon atoms; and a surface active agent.

5. A herbicidal composition comprising 10 to 90 parts by weight of N,N-diallyl-alpha-chloroacetamide and from 90 to 10 parts of 2-chloroallyl-N,N-diethyl dithiocarbamate.

6. A herbicidal composition comprising 10 to 90 parts by weight of N,N-diallyl-alpha-chloroacetamide and from 90 to 10 parts of 2-chloroallyl-N,N-diethyl dithiocarbamate; and a herbicide adjuvant.

7. A herbicidal composition comprising 10 to 90 parts by weight of N,N-diallyl-alpha-chloroacetamide and from 90 to 10 parts of 2-chloroallyl-N,N-diethyl dithiocarbamate; and a granular clay.

8. A herbicidal composition comprising 10 to 90 parts by weight of N,N-diallyl-alpha-chloroacetamide and from 90 to 10 parts of 2-chloroallyl-N,N-diethyl dithiocarbamate; and a surface active agent.

9. A herbicidal composition comprising 40 to 60 parts by weight of N,N-diallyl-alpha-chloroacetamide and from 60 to 40 parts of 2-chloroallyl-N,N-diethyl dithiocarbamate.

10. A herbicidal composition comprising 40 to 60 parts by weight of N,N-diallyl-alpha-chloroacetamide and from 60 to 40 parts of 2-chloroallyl-N,N-diethyl dithiocarbamate; and a herbicide adjuvant.

11. A herbicidal composition comprising 40 to 60 parts by weight of N,N-diallyl-alpha-chloroacetamide and from 60 to 40 parts of 2-chloroallyl-N,N-diethyl dithiocarbamate; and a granular clay.

12. A herbicidal composition comprising 40 to 60 parts by weight of N,N-diallyl-alpha-chloroacetamide and from 60 to 40 parts of 2-chloroallyl-N,N-diethyl dithiocarbamate; and a surface active agent.

References Cited in the file of this patent
UNITED STATES PATENTS

| | | |
|---|---|---|
| 2,864,683 | Hamm et al. | Dec. 16, 1958 |
| 2,919,182 | Harman et al. | Dec. 29, 1959 |

OTHER REFERENCES

Proceedings Weed Control Conference, Northeastern, 12th, 1958, pages 66 to 70 and 138 to 139.

Proceedings Weed Control Conference, Northeastern, 13th, 1959, pages 110 to 114 and 127 to 134.